July 9, 1957 C. L. ANDERSON 2,798,781

APPARATUS FOR HOUSING AND TRANSPORTING ELECTRONIC COMPONENTS

Filed April 8, 1954 3 Sheets-Sheet 1

INVENTOR
CARL L. ANDERSON
BY [signature]
ATTORNEY

APPARATUS FOR HOUSING AND TRANSPORTING ELECTRONIC COMPONENTS

Filed April 8, 1954 3 Sheets-Sheet 2

INVENTOR
CARL L. ANDERSON
BY [signature]
ATTORNEY

July 9, 1957 C. L. ANDERSON 2,798,781

APPARATUS FOR HOUSING AND TRANSPORTING ELECTRONIC COMPONENTS

Filed April 8, 1954 3 Sheets-Sheet 3

INVENTOR
CARL L. ANDERSON
BY Elmer J. Gorn
ATTORNEY

United States Patent Office 2,798,781

Patented July 9, 1957

2,798,781

APPARATUS FOR HOUSING AND TRANSPORTING ELECTRONIC COMPONENTS

Carl L. Anderson, Waltham, Mass., assignor to Raytheon Manufacturing Company, Waltham, Mass., a corporation of Delaware Application April 8, 1954, Serial No. 421,763

3 Claims. (Cl. 312—7)

This invention relates to electronic components, and particularly to apparatus for housing television components for ready interconnection and portability.

While not confined to such use, the apparatus herein disclosed lends itself to use in delivering to a television transmitting station electronic signals representing both the pictorial and the sound components of a program originating at a point some miles away from the transmitting station. Such a system, as disclosed and claimed in United States application Ser. No. 421,757, filed by Paul J. Pontecorvo and Sidney Topol on even date herewith, may operate to consolidate picture and sound signals in a single carrier wave of super-high frequency, and to radiate this S. H. F. carrier wave from an antenna assembly beaming the energy directly toward a receiving antenna assembly located on the roof or balcony of the building which houses the permanently installed telecasting and transmitting equipment. When so used, the invention can be embodied in two of the four major units of the Pontecorvo-Topol system, one of the units being set up at the point of origin of a transitory program, such as an athletic contest or street scene, and the other being set up at a location adjacent the permanently installed telecast equipment. Such location would normally be one of the regularly functioning television studios utilizing a regularly assigned video channel.

The invention, as herein illustrated, comprises a rectangular case of conventional "suitcase" dimensions and equipped with a carrying strap, or handle, corresponding to that of standard portable luggage. The case comprises seven major components, as follows: two complementary U-shaped shells whose terminal edges abut horizontally for joinder, one to the other, to form a rectangular encompassing frame, a flanged panel spanning said frame, two U-shaped brackets whose terminal edges abut vertically for joinder to form a rectangular clamping and supporting frame for the vertically disposed flanged panel, and two cover plates fitted with snap-on facilities for closure against front and rear edges, respectively, of the two-piece outer shell. The flanged panel referred to has multiple apertures for insertion of the electronic subassemblies, meters, etc. comprising the means for accomplishing the transmission or reception of the video and audio signals representing the recorded program.

These and other features and advantages obtainable by the use of the invention herein disclosed will become better understood upon reference to the following detailed description of the embodiments of the invention illustrated in the accompanying drawings wherein.

Figures 5, 6, 7, 8:
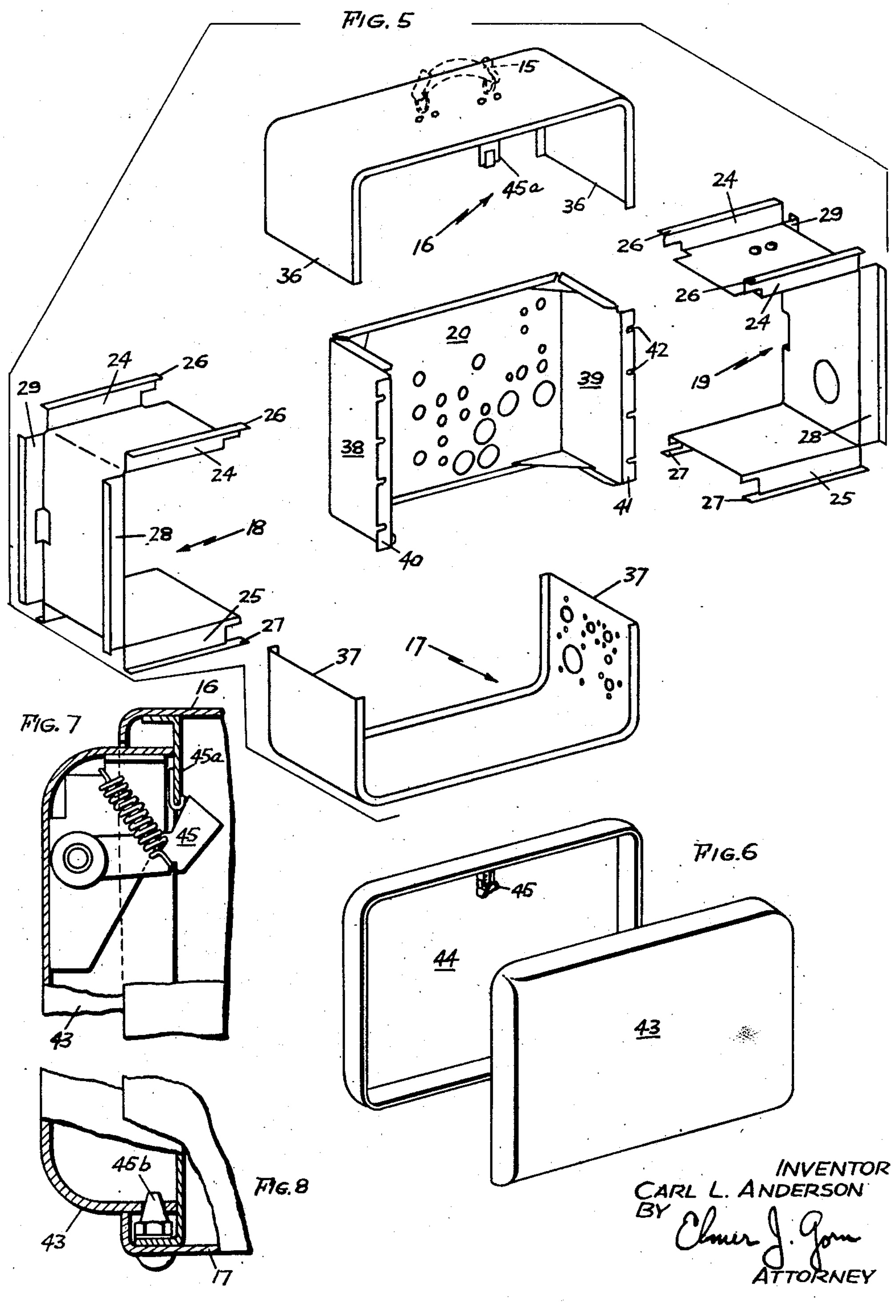
Fig. 5 is an exploded perspective view of the mechanical components of the case shown in Fig. 1.
Fig. 6 shows the covers.
Figs. 7 and 8 show details for attachment of the covers shown in Fig. 6.

The construction principles can best be appreciated by referring first to Fig. 5 wherein the two shell complements are shown at 16 and 17, the two brackets at 18 and 19, and the panel at 20. Shell 16 incorporates a carrying strap 15. Each bracket has horizontally disposed flanges 24 and 25 with tabs 26 and 27 adapted to lie against the upper and lower surfaces, respectively, of the shells 16 and 17, to be secured thereto by screws or the like (not shown). Vertically disposed flanges 28 and 29 on the brackets 18 and 19 are adapted to lie against the vertical surfaces of shell complements 16 and 17, and to be secured thereto by screws or the like (not shown). Before such securing operations are performed, however, the shell complements 16 and 17 are preferably united along their edge surfaces 36, 37, as by welding. Panel 20 has bounding sides 38 and 39 terminating in flanges 40 and 41 that are notched, as shown at 42, to receive securing screws threadable into flanges 28 of brackets 18 and 19.

Figure 4:
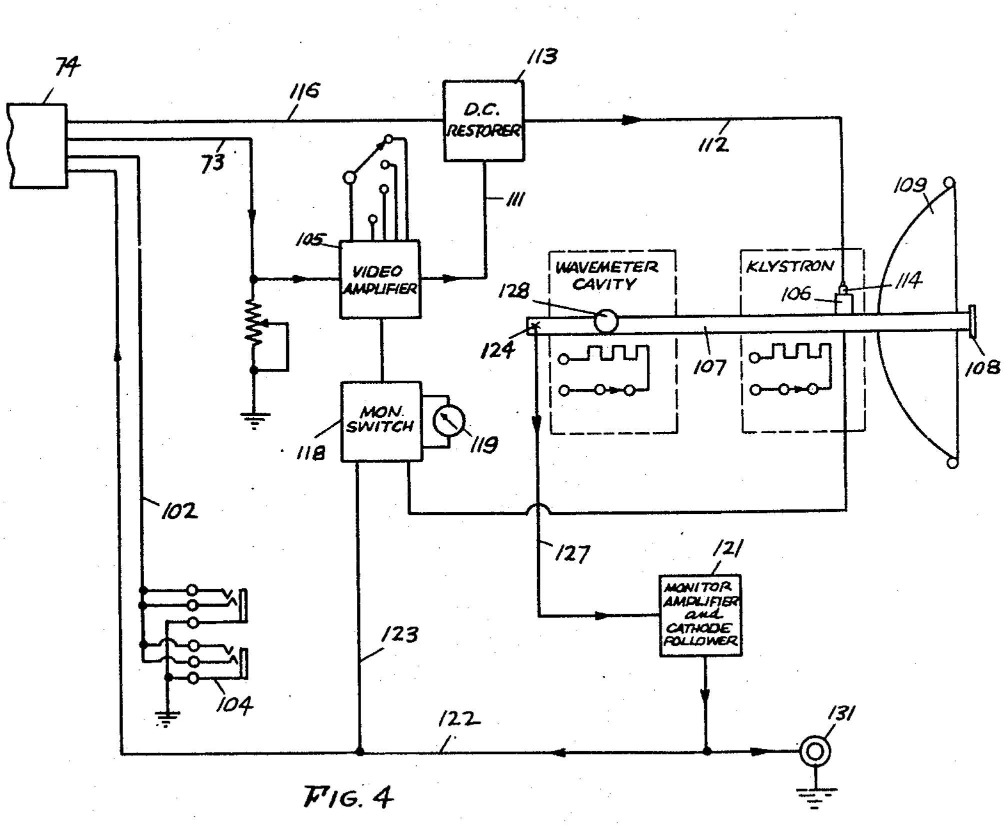

Before panel 20 has been screwed to the brackets 18 and 19 the electrical and electronic components may be mounted on the panel. The components to be carried by the panel 20 are shown in block diagram form in Fig. 2; related components corresponding to those of the system shown in the above-identified Pontecorvo-Topol application are shown in Fig. 4.

Figure 1:
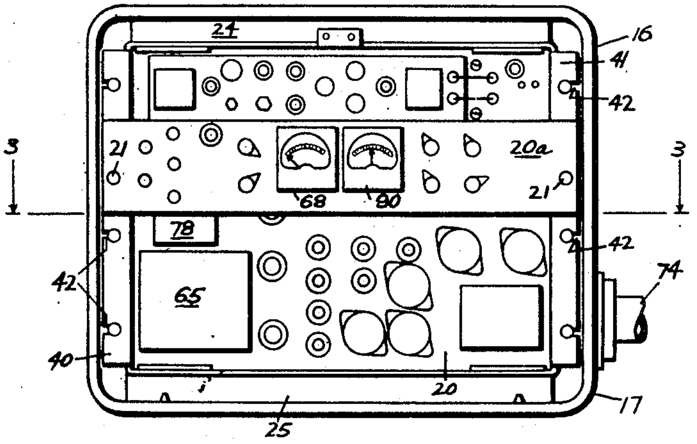
Fig. 1 is an elevation view of a rectangular case constituting an embodiment of the invention.
Figure 2:
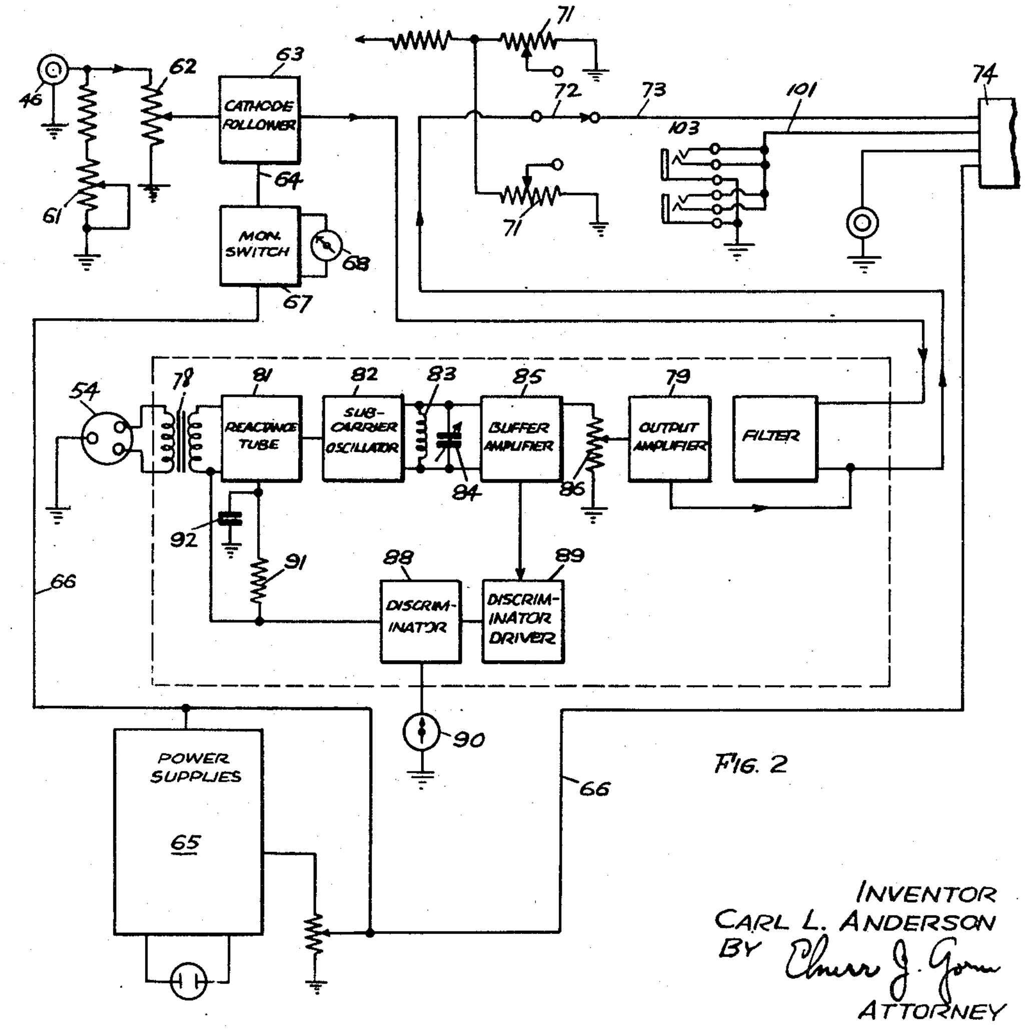
Figs. 2 and 4 are block diagrams of electrical and electronic components adapted for mounting upon panels to be built into cases such as the one shown in Fig. 1.
Figure 3:
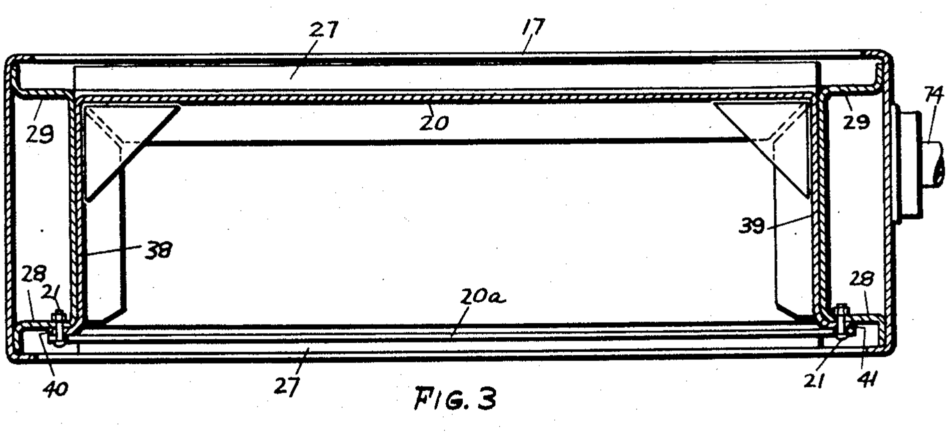
Fig. 3 is a horizontal sectional view along line 3—3 of Fig. 1.

As indicated in Fig. 2, the components carried by panel 20 may include a terminal 46 to which may be connected a conductor (not shown) leading to the video signal generating element forming part of the camera assembly recording the sequence to be telecast, as more fully explained in the patent application above identified. The panel may also carry a terminal 54 to receive a conductor (not shown) carrying the audio signals corresponding to the sounds picked up by one or more microphones supplementing the camera assembly referred to.

From these terminal connections 46 and 54, electrical conductors lead to the video and audio components, respectively, constituting the control assembly of the transmitter portion of such a system, all of said components being mounted upon the panel 20. In this connection, it will be noted that some of these components are attachable to the "front" surface of the panel and the others to the opposite surface, the panel itself being apertured appropriately, and disposed in a plane intermediate the front and rear edges of the portable case, so that components are attached to both front and rear surfaces of the panel in such a way as to confine all such components within the space bounded by the front and rear cover plates 43 and 44 which register with the edges of shell 16, 17, and are latchted thereto automatically by the inter-engagement of parts 45 and 45*a* (Fig. 7) to complete the portable case assembly. Pins 45*b* (Fig. 8) serve as pilots for such operations.

The control assembly video components shown in Fig. 2 (none of which, per se, are essential to the invention herein claimed) may also include adjustable resistors 61 and 62, a cathode follower amplifier 63, a plate supply circuit 64 leading thereto from a power supply assembly 65 by way of a conductor 66 and a monitoring switch 67 controlling tap-off connections to a meter 68 serving to provide a visual indication of the voltage being supplied to the plate of amplifier 63. The video portion of the control assembly includes a modulation controlling potentiometer 71, a selector switch 72, and a video output conductor 73 leading directly to the long cable 74 connecting the first portable case located at the picture-taking point with the second portable case located on the roof or other superstructure of the arena and forming part of the transmitting antenna assembly.

The audio portion of the control assembly includes a transformer 78 whose primary circuit leads directly from the audio input terminal 54, and whose secondary circuit supplies the stepped-up audio signal energy to the output amplifier 79 by way of reactance tube 81, subcarrier oscillator 82, filtering couple 83 and 84, buffer amplifier 85, and subcarrier level adjusting potentiometer 86. The circuit just traced also includes feedback connections from buffer amplifier 85 to the secondary of transformer 78 for the purpose of maintaining automatic control of the frequency of the audio signals. As shown, this feedback circuit includes a discriminator 88 and a discriminator driver 89 receiving its excitation from the output of buffer amplifier 85. An additional meter 90 mounted in panel 47 enables the equipment operator to observe the functioning of the frequency controlling circuit just described. This circuit also includes a D. C. feedback branch containing a resistor 91 controlling the D. C. voltage delivered back to the control grid of reactance tube 81, this resistor feedback circuit having an overload connection to ground by way of capacitor 92.

From the control unit the conductors 66 and 73 lead to the case associated with the transmitting antenna assembly, and for this purpose the conductors are preferably enclosed in a common shielding cable 74, which cable also encloses the conductors 101 and 102, constituting the connections between the two intercommunication switch assemblies 103 and 104 located in the case 16—17 and its counterpart, and serving as the means for exchange of any necessary instructions between the attendants at the two locations of the respective units. Conductor 73 also leads to the video amplifier components of the antenna assembly, which components operate to increase the strength of the video signals sufficiently for the necessary excitation of the local oscillator unit 106 forming part of the wave guide assembly 107 which terminates in the transmitting antenna terminal 108 cooperating with the antenna reflector 109 to transmit the composite video signal carrier wave with its audio frequency subcarrier. The circuits 111 and 112 leading from the video amplifier component 105 to the klystron oscillator 106 also include a direct current restoring component for converting the A. C. output of the amplifier 105 to a D. C. voltage for application to the repeller terminal 114 of the klystron 106, this restoring unit 113 having a conduit 116 leading thereto by way of the cable 74, which conduit 116 is actually the extension of the repeller voltage control circuit 66 previously described. The amplifier component 105 may also have associated therewith testing and monitoring units, as indicated at 118 and 119, for observing and regulating the output of amplifier 105 and thereby controlling (in conjunction with the voltage supplied over circuit 66) the voltage applied to the repeller terminal 114. For this purpose, the testing unit 118 is adapted to receive energization from the amplifying unit 121 by way of the interconnecting conduits 122 and 123, the amplifier 121 being, in turn, excited by the output of the crystal detector unit 124 located adjacent the inner end of the wave guide 107 and adapted to supply the amplifier 121 by reason of the intervening conduit 127. The wave guide 107 is also preferably equipped with a regulating wave measuring resonant cavity 128 adapted to operate through the crystal detector unit 124 to maintain stability in the microwave output frequency radiated from the antenna terminal 108. The antenna case assembly is completed by the provision of an additional monitoring unit 131 for observing and regulating the output of amplifier 121 if such additional monitoring is considered necessary.

If necessary for proper mounting of the meters 68 and 90 and other accessories, the panel 20 may be supplemented by an auxiliary panel 20a spanning the flanges 40 and 41 and secured thereto (as are flanges 28 of brackets 18 and 19), by bolts 21.

This invention is not limited to the particular details of construction, materials and processes described, as many equivalents will suggest themselves to those skilled in the art.

What is claimed is:

1. In a portable high frequency radiant energy program relaying apparatus, a circuit component supporting and enclosing case comprising a pair of complementary U-shaped shell elements whose extremities abut in a single horizontal plane to form an encompassing frame, a flanged panel spanning said frame, a pair of U-shaped brackets whose extremities abut in a single vertical plane to form an inner frame for said panel, means facilitating attachment of said panel to said brackets, and means facilitating attachment of said brackets to said shell elements.

2. In a portable electronic apparatus, a circuit component supporting an enclosing case comprising a pair of complementary U-shaped shell elements whose extremities abut in a single horizontal plane to form an encompassing frame, a flanged panel spanning said frame, a pair of U-shaped brackets whose extremities abut in a single vertical plane to form an inner frame for said panel, means facilitating attachment of said panel to said brackets, means facilitating attachment of said brackets to said shell elements, and automatically latching closure elements having peripheral edges whose contour conforms to that of said shell elements for completing the assembly.

3. In a portable electronic apparatus, a circuit component supporting and enclosing case comprising a substantially rectangular shell element forming an encompassing frame, a flanged panel spanning said frame, a pair of U-shaped brackets whose extremities abut in a single vertical plane to form an inner frame for said panel, means facilitating attachment of said panel to said brackets, means facilitating attachment of said brackets to said shell element, and self-latching closure elements having peripheral edges whose contour conforms to that of said shell elements for completing the assembly.

References Cited in the file of this patent

UNITED STATES PATENTS

| | | |
|---|---|---|
| 1,944,687 | Henderson | Jan. 23, 1934 |
| 2,053,941 | Booth | Sept. 8, 1936 |

FOREIGN PATENTS

| | | |
|---|---|---|
| 914,909 | France | Oct. 22, 1946 |